US011596885B2

(12) United States Patent
Howe et al.

(10) Patent No.: US 11,596,885 B2
(45) Date of Patent: Mar. 7, 2023

(54) OIL SEQUESTERING SPIN-ON CARTRIDGE

(71) Applicant: Bendix Commercial Vehicle Systems LLC, Elyria, OH (US)

(72) Inventors: Stephen Howe, Elyria, OH (US); David W. Perry, Elyria, OH (US); Timothy Carritte, Elyria, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 884 days.

(21) Appl. No.: 16/404,867

(22) Filed: May 7, 2019

(65) Prior Publication Data

US 2020/0353389 A1 Nov. 12, 2020

(51) Int. Cl.
  *B01D 35/30* (2006.01)
  *E21B 43/12* (2006.01)

(52) U.S. Cl.
  CPC .......... *B01D 35/30* (2013.01); *B01D 2201/29* (2013.01); *E21B 43/12* (2013.01)

(58) Field of Classification Search
  CPC ................ B01D 35/30; B01D 2201/29; B01D 2253/104; B01D 2253/106; B01D 2253/108; B01D 2258/06; B01D 46/0031; B01D 53/261; B01D 46/003; E21B 43/12

USPC ..... 210/440, 441, 443, 455, DIG. 5, DIG. 6, 210/DIG. 7, 150, 151, 180, 188; 55/482, 55/392, 428, 485, 486, DIG. 17; 96/134, 96/144
  See application file for complete search history.

(56) References Cited

U.S. PATENT DOCUMENTS

| 1,329,559 | A | 2/1920 | Tesla |
| 7,846,242 | B2 | 12/2010 | Paling et al. |
| 8,037,620 | B2 | 10/2011 | Grobler et al. |
| 8,291,976 | B2 | 10/2012 | Schultz et al. |
| 2007/0144350 | A1 * | 6/2007 | Paling ................. B01D 53/261 96/134 |

* cited by examiner

*Primary Examiner* — Madeline Gonzalez
(74) *Attorney, Agent, or Firm* — Reising Ethington P.C.

(57) ABSTRACT

An oil sequestering, air-drying cartridge device comprises a pair of tandem fluid diodes for respectively preventing backflow of moist air into an oil coalescing filter and preventing backflow of dry air into a desiccant material. The device comprises an outer cartridge skin and a middle shell concentrically nested between the cartridge skin and an inner shell. The middle shell houses channel walls having offset wave-like contours that prevent backflow of moist air into the oil filter, and the inner shell comprises similar channel walls that prevent backflow of dry air into the desiccant, which is positioned between the inner and middle shells.

19 Claims, 6 Drawing Sheets

OIL SEQUESTERING SPIN-ON CARTRIDGE

BACKGROUND

The present application finds particular application in oil filtering devices. However, it will be appreciated that the described techniques may also find application in other filtering systems, or other vehicular devices.

Conventional approaches to oil sequestration include a check valve system for ensuring that the purge air flow bypasses a coalescing filter.

Another traditional approach relates to a wellbore having fluid diodes incorporated into the sleeve of the wellbore. Fluid flow in the opposite direction is restricted by the configuration of the diodes.

The present innovation provides new and improved systems and methods that facilitate providing an air-drying oil requesting filter cartridge, which overcome the above-referenced problems and others.

SUMMARY

In accordance with one aspect, an air drying, oil sequestering cartridge device comprises an outer shell, and a coalescing filter that sequesters oil from a mixture as the mixture passes into the device. The device further comprises a middle shell having a first fluid diode structure that prevents backflow of moist air into the coalescing filter after sequestering of the oil from the mixture, and an inner shell comprising a second fluid diode structure that prevents backflow of dried air during purging from the device.

In accordance with another aspect, a tandem fluid diode system for an air-drying, oil sequestering cartridge device comprises a first fluid diode that prevents backflow of moist air into a coalescing oil filter after sequestering of oil from the moist air, the first fluid diode being housed in a middle shell of the cartridge device, and a second fluid diode structure that prevents backflow of dried air during purging from the device, the second fluid diode being housed in an inner shell of the cartridge device. The middle shell is concentrically nested between the inner shell and an outer skin of the cartridge device.

In accordance with another embodiment, an air drying, oil sequestering cartridge device comprises an outer shell; a coalescing filter that sequesters oil from a mixture as the mixture passes into the coalescing filter from a middle shell, wherein the middle shell comprises a charging fluid diode structure that prevents backflow of the mixture; and an inner shell comprising a purging fluid diode structure that prevents backflow of dried air during purging from the device.

One advantage is that moving parts are reduced or eliminated

Another advantage is that vaporized oil is sequestered from dry purge air.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described oil sequestering device(s), which provide a spin-on air dryer cartridge that combines the functions of coalescing oil, sequestering oil, and desiccating air. The device provides clean dry air to the system, purges water vapor from the device, and keeps the oil from exiting the device. In one embodiment, the flow of air proceeds in one direction through the coalescing filter. The purge flow of the opposite direction is redirected around the filter to prevent oil from escaping the filter. Oil that is coalesced is collected in a reservoir. In a related embodiment, one or more fluid diode one way valves are integrated into the air-drying cartridge body. The one way valve allows normal charging air flow, but prevents backflow through a series of pathways imprinted in the cartridge. The cartridge can be sealed against the housing wall. The described cartridge device thus permits charging air flow to proceed through a coalescing filter while preventing substantially all of the purge air flow from crossing the filter while collecting the oil separately.

Figure 1:
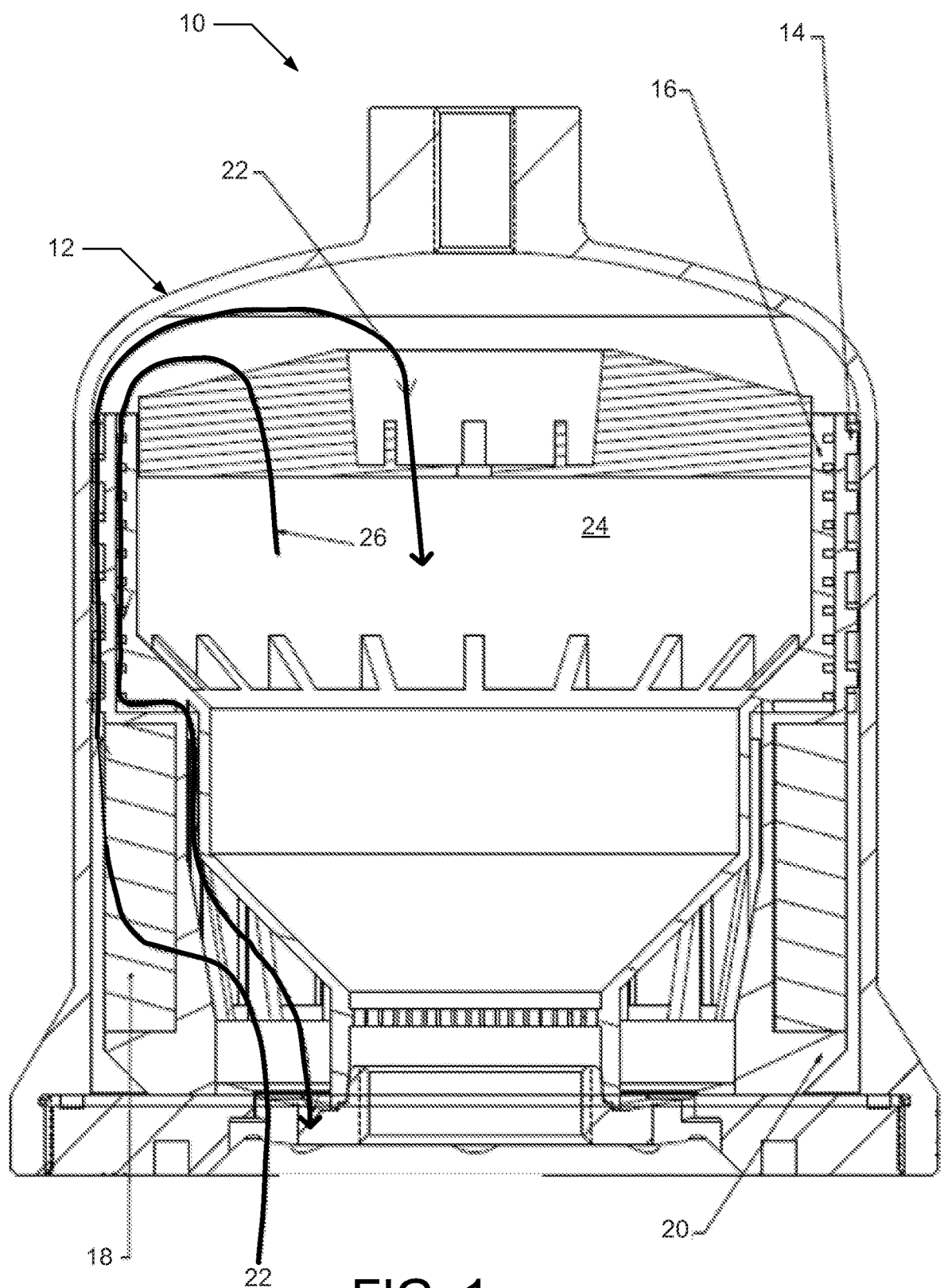
FIG. 1 shows a cut-away view of an air drying, oil sequestering cartridge device, in accordance with one or more features described herein.

FIG. 1 shows a cut-away view of an air drying, oil sequestering cartridge device 10, in accordance with one or more features described herein. The device 10 comprises an outer shell or skin 12, a middle shell 14 through which a mixture passes into the device 10, and an inner shell 16 through which air exits the device 10. The mixture entering the device comprises oil, air, and moisture, and passes through a coalescing filter 18 where oil in the mixture is coalesced and allowed to flow back out of the device through an oil sump 20. The coalescing filter 18 may be _polypropylene, microfiber glass, polyester or other suitable material. Removal of the oil from the mixture is desirable in order to facilitate drying of the moist air before purging the air from the device 10, since oil in the moist air can detrimentally affect any desiccant material employed to remove the moisture.

Figure 2:
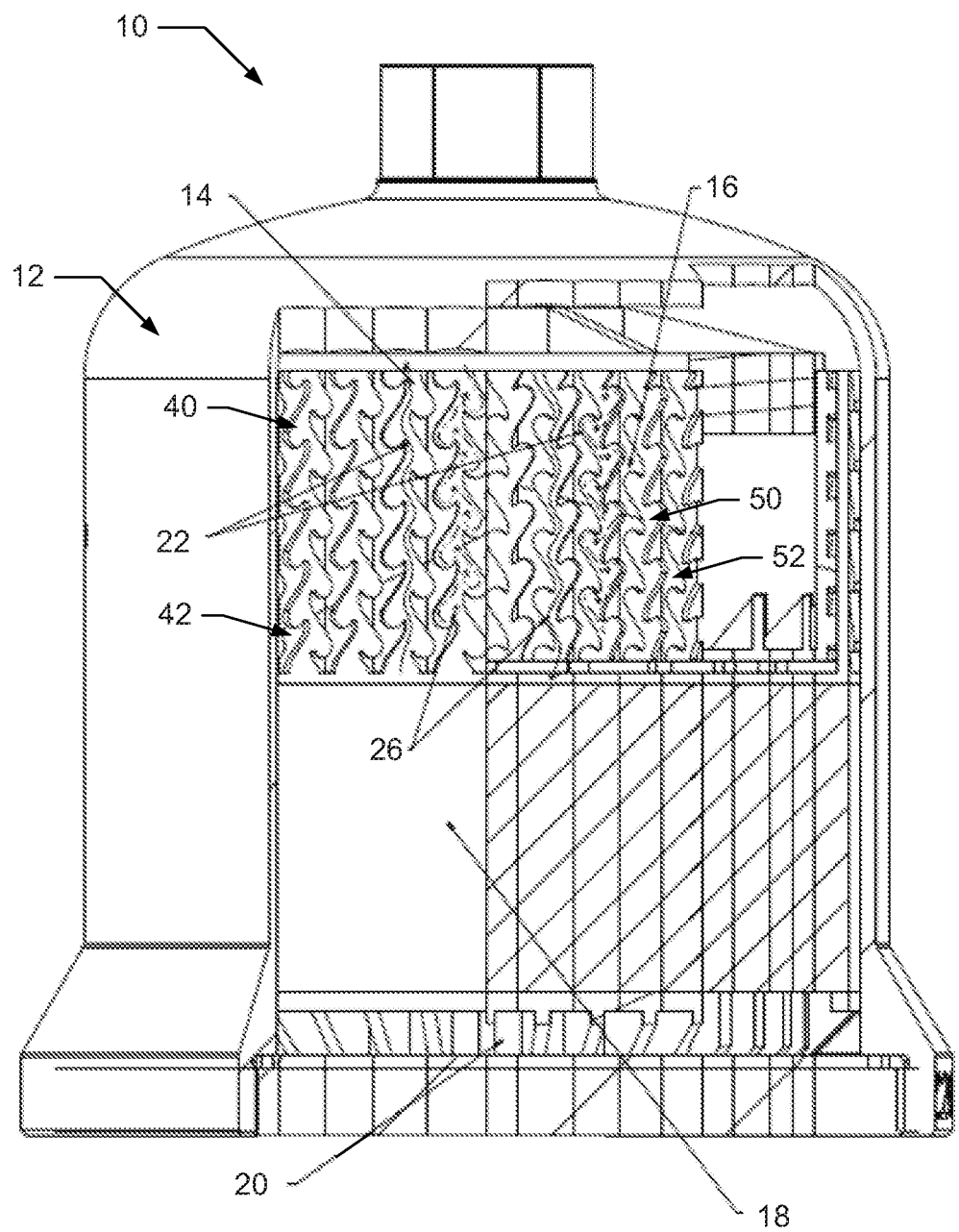
FIG. 2 shows a cutaway view of the air drying, oil sequestering cartridge device and outer shell, with the inner shell 16 and middle shell shown in greater detail, in accordance with various features described herein.

Once the oil has been coalesced by the filter 18, the remaining moist air continues through the fluid diode of the middle shell 14, which prevents backflow due to the interior shape of the flow channels through which the moist air flows (shown in greater detail in FIG. 2). Collectively, the inward flow into the device is referred to as "charge flow", and the path of the charge flow 22 is shown in FIG. 1 where the moist air passes through a desiccant material 24. Desiccant materials employed in conjunction with the various embodiments described herein may include, without being limited to: silica gel, zeolite molecular sieve, activated alumina, And/or any other suitable material. From the desiccant 24, a purge flow path 26 is shown. The dry air leaves the desiccant 24 and passes through a fluid diode of the inner shell 16, which prevents backflow into the desiccant material due to the interior shape of the flow channels therein.

FIG. 2 shows a cutaway view of the air drying, oil sequestering cartridge device 10 and outer shell 12, with the inner shell 16 and middle shell 14 shown in greater detail, in accordance with various features described herein. The coalescing filter 18 and oil sump 20 are also shown. Each of the middle shell 14 and inner shell 16 are cylindrical, and are arranged concentrically such that the inner shell 16 is nested within the middle shell 14, which in turn is nested within the outer shell 12. Similarly, the coalescing filter 18 is positioned against the outer shell 12 and below the inner and middle shells.

The direction of the charge flow 22 is shown by a line traveling upward through a flow channel 40 delineated by the channel walls 42 in the middle shell 14. The charge flow 22 is also shown as an impeded or turbulent flow in a reverse direction in the flow channel 50 of the inner shell. This is because charge flow is not permitted in the reverse direction of the inner shell but rather impeded by the t recesses or troughs of the cresting waves of the channel walls 52 of the inner shell 16. The shape of the channel walls 42, 52, is described in greater detail in FIG. 5.

Similarly, the direction of the purge flow 26 is shown by a line traveling upward through a flow channel 50 delineated by the channel walls 52 in the inner shell 16. The purge flow 26 is also shown as an impeded or turbulent flow in a reverse direction in the flow channel 40 of the middle shell. This is because purge flow is not permitted in the reverse direction of the middle shell but rather impeded by the recesses of the crested wave edges of the channel walls 42 of the middle shell 14.

Figure 3:
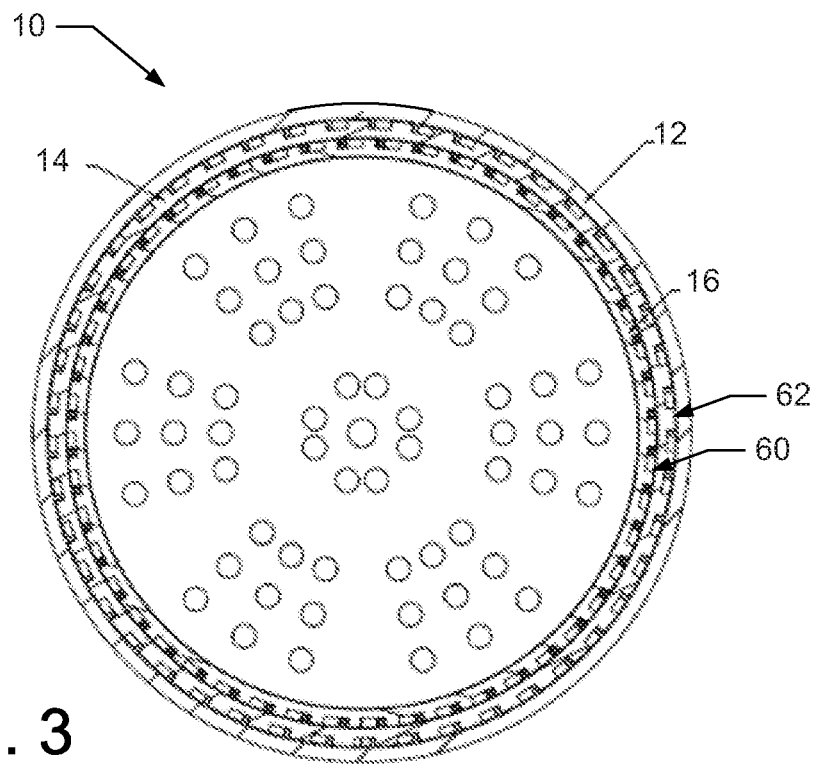
FIG. 3 shows a top-down view of the interior of the air drying, oil sequestering device 10, in accordance with various embodiments described herein.

FIG. 3 shows a top-down view of the interior of the air drying, oil sequestering device 10, in accordance with various embodiments described herein. The device 10 as shown includes the cartridge skin or outer shell 12, the middle shell 14 through which charge flow of moist air occurs after oil sequestering, and the inner shell 16 through which purge flow of dry air occurs after desiccation. As can be seen, the inner shell 16 is nested concentrically within the middle shell such that the inner wall 60 of the middle shell 14 forms an outer wall of the inner shell 16. Similarly, the middle shell 14 is nested concentrically between the inner shell 16 and the cartridge skin 12, such that the inner wall 62 of the cartridge skin forms the outer wall of the middle shell 14.

Figure 4:
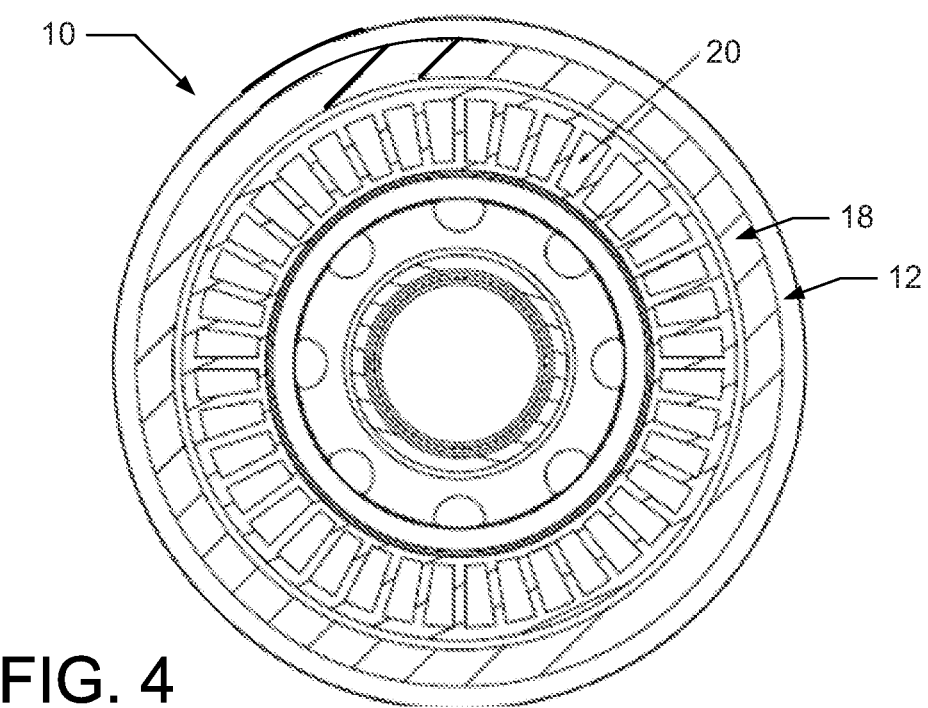
FIG. 4 shows a bottom-up view of the interior of the air drying, oil sequestering device 10, in accordance with various embodiments described herein.

FIG. 4 shows a bottom-up view of the interior of the air drying, oil sequestering device 10, in accordance with various embodiments described herein. The device 10 as shown includes the cartridge skin or outer shell 12, the sequestering filter 18, and the oil sump 20 positioned below the filter 18.

Figure 5:
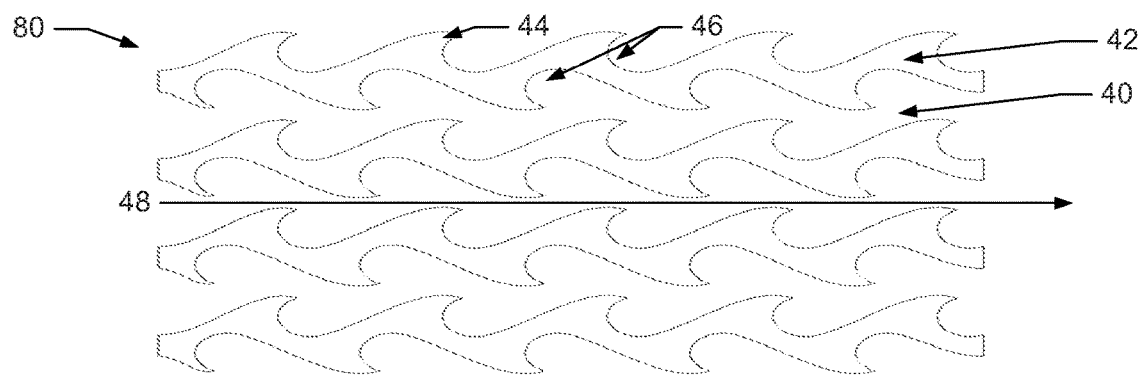
FIG. 5 shows a more detailed view of the flow channels and channel walls of the middle shell, in accordance with one or more features described herein.

FIG. 5 shows an embodiment 80 of the flow channels 40 and channel walls 42 of the middle shell 14 (FIG. 2), in accordance with one or more features described herein. The channel walls are shown as having a crested wave-like peak 44 with staggered troughs 46 that mitigate backflow in a reverse direction while permitting forward flow 48. In the forward direction, airflow faces a favorable pressure gradient which maintains laminar flow. In the reverse direction the airflow faces an unfavorable pressure gradient which generates flow separation and recirculation that interferes with the progress of the flow through the device. It will be understood that the channels 50 and channel walls 52 of the inner shell 16 (FIG. 2) may be configured to have a similar shape as channels 40 and channel walls 42, or may be configured to have a different shape. In the illustrated example, the troughs 46 are unimpeded, devoid of any "islands" or other structures.

Figure 6:
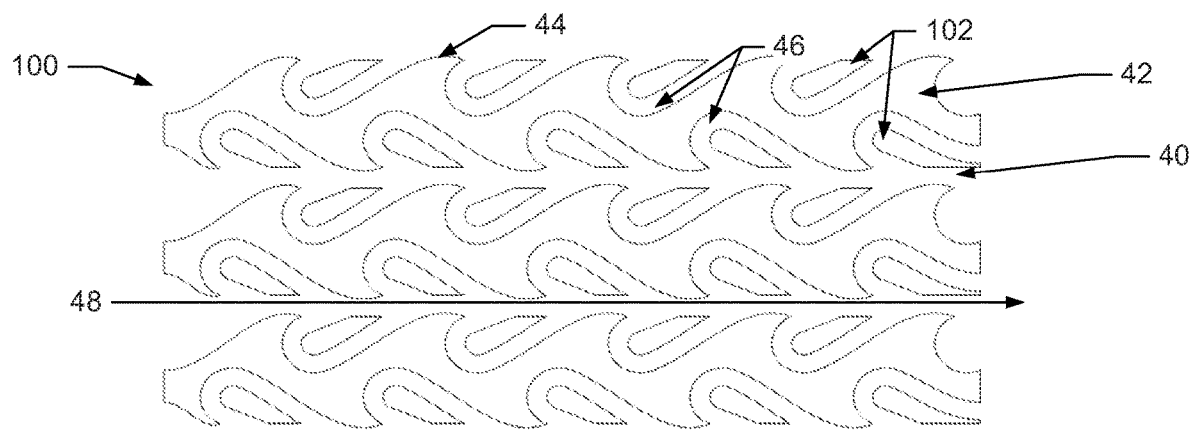
FIG. 6 illustrates another embodiment of the flow channels and channel walls of the middle shell, in accordance with one or more features described herein.

FIG. 6 illustrates another embodiment 100 of the flow channels 40 and channel walls 42 of the middle shell 14 (FIG. 2), in accordance with one or more features described herein. The channel walls are shown as having a crested wave-like peak 44 with staggered troughs 46 that mitigate backflow in a reverse direction while permitting forward flow 48. The misalignment of the troughs creates a backflow reversal feature that facilitates forward flow in a pressure-dependent direction while redirecting backflow into the forward direction, interfering with the reverse flow. Each trough comprises an island feature 102. It will be understood that the channels 50 and channel walls 52 of the inner shell 16 (FIG. 2) may be configured to have a similar shape as channels 40 and channel walls 42, or may be configured to have a different shape.

Figure 7:
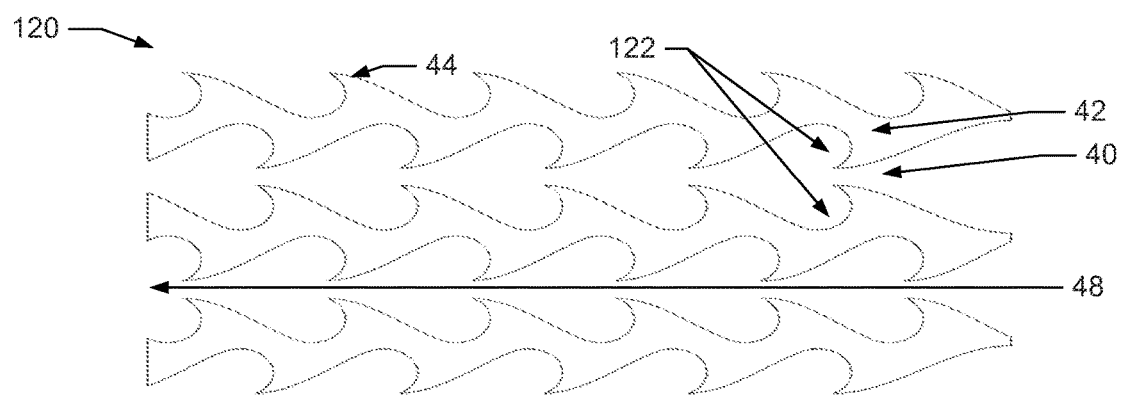
FIG. 7 illustrates another embodiment of the flow channels and channel walls of the middle shell, in accordance with one or more features described herein.

FIG. 7 illustrates another embodiment 120 of the flow channels 40 and channel walls 42 of the middle shell 14 (FIG. 2), in accordance with one or more features described herein. The channel walls are shown as having a crested wave-like peak 44 with aligned troughs 46 that mitigate backflow in a reverse direction while permitting forward flow 48. The alignment of the troughs forms a heart-shaped backflow reversal feature that facilitates forward flow in a pressure-dependent direction while re-directing backflow into the forward direction, thus interfering with the reverse flow. It will be understood that the channels 50 and channel walls 52 of the inner shell 16 (FIG. 2) may be configured to have a similar shape as channels 40 and channel walls 42, or may be configured to have a different shape. It will further be appreciated that the aligned troughs 46 may also further include islands (not shown in FIG. 7) such as those described with regard to FIG. 6. The of the asymmetrical features along the direction of the flow acts as a fluid diode. For example, a channel wall shaped like a series of saw teeth would act in a similar manner to the described crested wave.

Although the shape or contours of the channel walls 42, 52 of the preceding Figures are described above as a crested wave or the like, it will be understood that other shapes are contemplated in conjunction with the various features and embodiments described herein. Furthermore, although the aspect ratio of the channel wall contour in the illustrated example is approximately 3:1 (length:depth) other aspect ratios may be employed in conjunction with the herein-described features and embodiments as will be appreciated by those of skill in the art.

Figure 8:
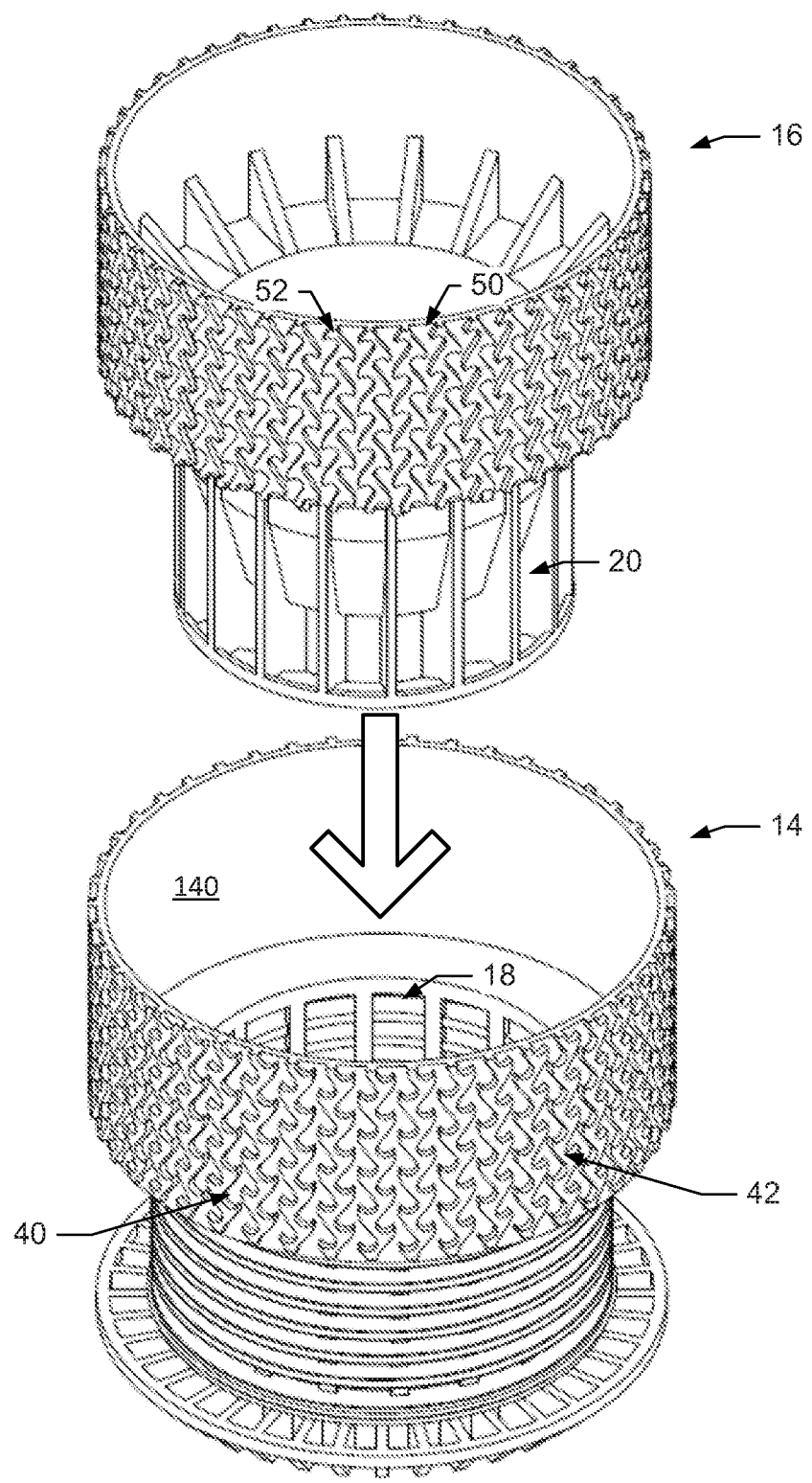
FIG. 8 is an illustration of an exploded perspective view of the herein-described device, showing the cylindrical middle shell, into which the inner shell is inserted into a nested concentric configuration during assembly, in accordance with one or more aspects described herein.

FIG. 8 is an illustration of an exploded perspective view of the herein-described device, showing the cylindrical middle shell 14, into which the inner shell 16 is inserted into a nested concentric configuration during assembly, in accordance with one or more aspects described herein. The middle shell 14 is shown with the flow channels 40 defined by the channel walls 42, and comprises the coalescing filter 18 that forms a cylindrical ring that is positioned below the middle shell and around the oil sump 20 when assembled.

The inner shell 16 comprises flow channels 50, which are defined by the flow channels 52, when nested inside the middle shell 14, the inner wall 140 of the middle shell seals against the outer surface of the channel walls 52 to form the flow channels 50. In similar fashion, the outer surfaces of the channel walls 42 seal against an inner wall of an outer shell or skin (not shown in FIG. 8) of the described device to form the flow channels 40. Also shown is the oil sump portion 20 of the device, which is positioned below the inner shell 16 and nested inside the coalescing filter 18 when assembled.

In one embodiment, the middle shell includes a single diode structure. In another embodiment, the middle shell and inner shell are integrated into a single structure.

With continued reference to FIGS. 1-8, the described air-drying, oil sequestering cartridge device facilitates reducing an amount of oil that exits the cartridge. This feature overcomes the problem seen with conventional oil filters where sequestered oil spits when purged from the cartage due in part to aerosolization. By rerouting airflow around the coalescing filter 18 during purging, dry air is purged while oil is sequestered and returned to the oil sump.

In one embodiment, the inner shell 16 and middle shell 14 are formed of a plastic material or the like, and have a smooth inner surface with channels and raised channel walls that are visible (e.g., prior to cartridge assembly) but no outer wall. Alternatively, the shells can be formed of substantially plastic material and rubber overmold to form the channels. The outermost surface of the channel walls of the inner shell 16 mate tightly and flush with a flat inner wall of the middle shell to form a seal that permits flow through the channels of the inner shell without leakage. Similarly, the outermost surface of the raised channel walls of the middle shell are visible (e.g., prior to cartridge assembly) and mate with a flat inner wall of the cartridge shell or housing to form a seal that permits flow through the channels of the middle shell without leakage.

The described oil sequestering device may be considered a tandem fluid diode system, comprising a first fluid diode (i.e., the middle shell 14) that prevents backflow of moist air into the coalescing oil filter after sequestering of oil from the moist air, and a second fluid diode structure (i.e., the inner shell 16) that prevents backflow of dried air during purging from the device. The middle shell 14 is concentrically nested between the inner shell and an outer skin of the cartridge device. A desiccant material through which the moist air is passed is positioned in a direction of air flow between the middle shell and the inner shell. The first fluid diode receives the moist air from a coalescing filter after sequestering of oil from the moist air, and the moist air is passed through the desiccant material before traveling through the second fluid diode.

In one embodiment, the middle shell is formed as a cylindrical ring having a smooth inner surface and a plurality of channel walls having flat outer surfaces that mate with a smooth inner surface of the outer shell to form flow channels through which the moist air flows. The channel walls 42 of the middle shell have lateral surfaces comprising crested wave contours that form the flow channels and prevent backflow. The flow channels 40 have curved troughs that are aligned or misaligned and may include island structures that further facilitate backflow prevention.

The inner shell is similarly formed as a cylindrical ring having a smooth inner surface and a plurality of channel walls having flat outer surfaces that mate with a smooth inner surface of the middle shell to form flow channels through which the dried air flows. The channel walls 52 of the inner shell have lateral surfaces comprising crested wave contours that form the flow channels and prevent backflow. The flow channels 50 have curved troughs that are aligned or misaligned and may include island structures that further facilitate backflow prevention.

In one embodiment, the inner shell and the middle shell are formed of a plastic material. The middle shell may be concentrically nested between the inner shell and the outer skin of the cartridge device. The coalescing filter may be positioned below the concentrically nested inner shell and middle shell, and above and/or around an oil sump into which sequestered oil flows.

It will be appreciated that as the number of the fluid diodes increases within a given length of channel, backflow is further reduced. Thus, for a given application or desired amount of backflow prevention, the height of the inner and middle channels can be increased to improve backflow prevention or decreased to reduce cartridge size once a maximum acceptable amount of backflow is determined for the given application. In one embodiment, the height of the middle shell and the inner shell, and thus the lengths of the flow channels therein are equal. In another embodiment, the heights of the middle shell and the inner shell need not be equal, depending on an amount of backflow prevention desired for the first fluid diode and the second fluid diode, which may be independent of each other. The first fluid diode and the second fluid diode may have the same geometry or they may have different geometries. In general, the more diodes shaped into the shell, the better the action as a diode.

Figure 9:
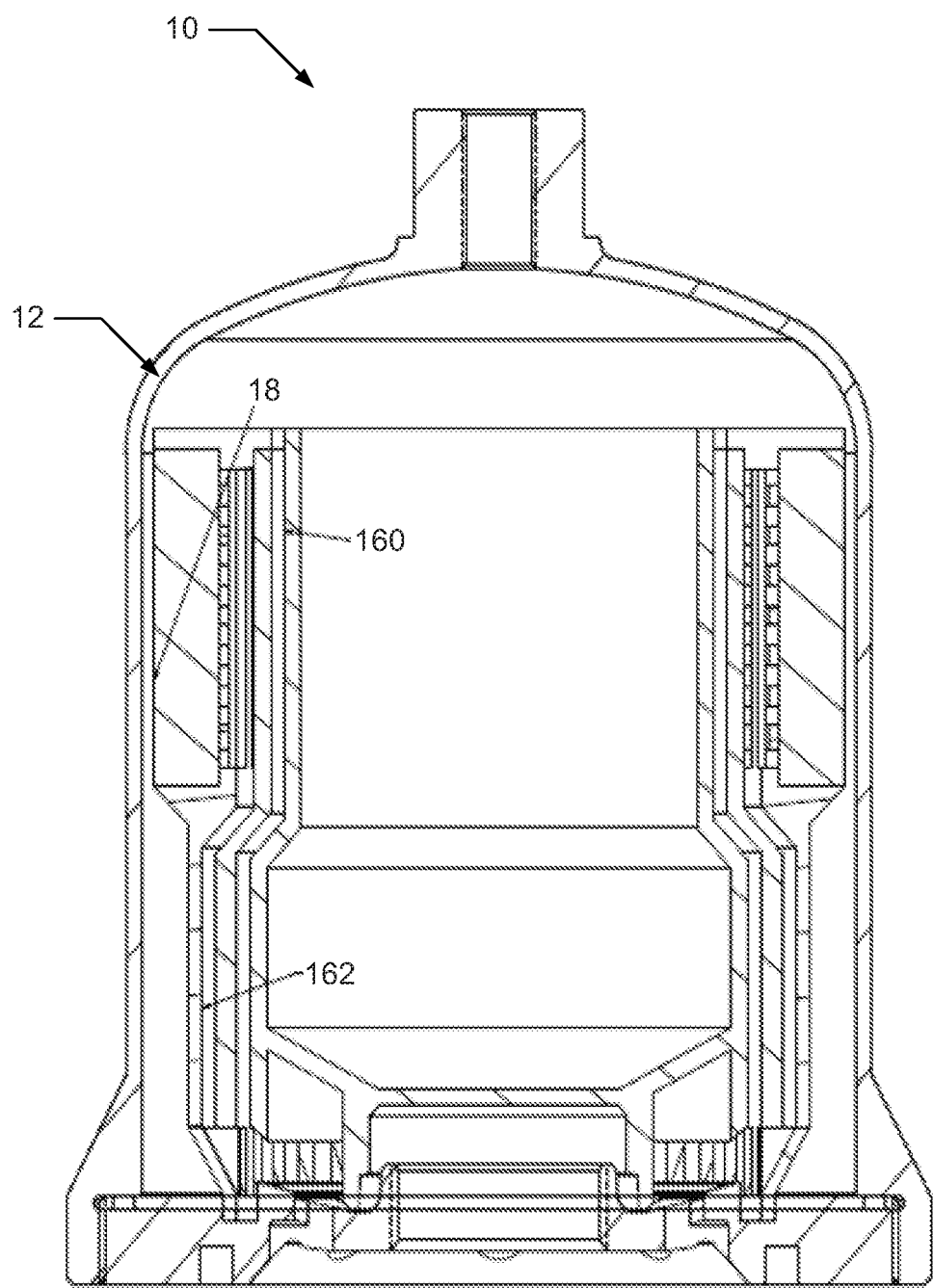
FIG. 9 illustrates shows a cutaway view of another embodiment of the air drying, oil sequestering cartridge device and outer shell, with a purging diode (i.e., the inner shell) and a charging diode (i.e., the middle shell), in accordance with various features described herein.

FIG. 9 illustrates shows a cutaway view of another embodiment of the air drying, oil sequestering cartridge device 10 and outer shell 12, with a purging diode 160 (i.e., the inner shell) and a charging diode 162 (i.e., the middle shell), in accordance with various features described herein. In contrast to the preceding figures, the coalescing filter 18 is positioned against the outer shell 12 and above the charging diode 162. In all other respects (i.e., charge flow path, purge flow path, etc.) the cartridge device operates as described with regard to the preceding figures.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. An air drying, oil sequestering cartridge device, comprising:
    an outer shell;
    a coalescing filter that sequesters oil from a mixture as the mixture passes into the device;
    a middle shell having a first fluid diode structure that prevents backflow of moist air into the coalescing filter after sequestering of the oil from the mixture;
    and an inner shell comprising a second fluid diode structure that prevents backflow of dried air during purging from the device;

wherein the middle shell is formed as a cylinder having a smooth inner surface and a plurality of channel walls having outer surfaces that mate with a smooth inner surface of the outer shell to form flow channels through which the moist air flows.

2. The air drying, oil sequestering device according to claim 1, further comprising a desiccant material through which the moist air is passed between the middle shell and the inner shell.

3. The air drying, oil sequestering device according to claim 1, wherein the channel walls of the middle shell have lateral surfaces comprising crested wave contours that form the flow channels and prevent backflow.

4. The air drying, oil sequestering device according to claim 1, wherein the inner shell is formed as a cylinder having a smooth inner surface and a plurality of channel walls having outer surfaces that mate with a smooth inner surface of the middle shell to form flow channels through which the moist air flows.

5. The air drying, oil sequestering device according to claim 4, wherein the channel walls of the inner shell have lateral surfaces comprising crested wave contours that form the flow channels and prevent backflow.

6. The air drying, oil sequestering device according to claim 4, wherein the inner shell and the middle shell are substantially formed of a plastic material.

7. The air drying, oil sequestering device according to claim 4, wherein the middle shell is concentrically nested between the inner shell and a cartridge shell.

8. The air drying, oil sequestering device according to claim 7, wherein relative to a top of the cartridge device, the coalescing filter is positioned below the concentrically nested inner shell and middle shell, and above an oil sump into which sequestered oil flows.

9. The air drying, oil sequestering device according to claim 1, wherein relative to a top of the cartridge device, the coalescing filter is concentrically nested against the inner shell and above the middle shell and an oil sump into which sequestered oil flows.

10. A tandem fluid diode system for an air-drying, oil sequestering cartridge device, comprising:
 a first fluid diode structure for receiving charge air in a preferred direction, the first fluid diode structure preventing backflow of moist air into a coalescing oil filter during a purge cycle; and
 a second fluid diode structure for receiving purge air in a preferred direction, the second fluid diode structure preventing charge air from bypassing the coalescing filter during a charge cycle;
 wherein the first fluid diode structure is housed in a middle shell of the cartridge device, the second fluid diode structure being housed in an inner shell of the cartridge device, and the middle shell is concentrically nested between the inner shell and an outer skin of the cartridge device; and
 wherein the middle shell is formed as a cylindrical ring having a smooth inner surface and a plurality of channel walls having flat outer surfaces that mate with a smooth inner surface of the outer shell to form flow channels through which the moist air flows.

11. The tandem fluid diode system according to claim 10, further comprising a desiccant material through which the moist air is passed between the middle shell and the inner shell.

12. The tandem fluid diode system according to claim 10, wherein the first fluid diode receives the moist air from a coalescing filter after sequestering of oil from the moist air.

13. The tandem fluid diode system according to claim 10, wherein the channel walls of the middle shell have lateral surfaces comprising crested wave contours that form the flow channels and prevent backflow.

14. The tandem fluid diode system according to claim 10, wherein the inner shell is formed as a cylindrical ring having a smooth inner surface and a plurality of channel walls having flat outer surfaces that mate with a smooth inner surface of the middle shell to form flow channels through which the moist air flows.

15. The tandem fluid diode system according to claim 14, wherein the channel walls of the inner shell have lateral surfaces comprising crested wave contours that form the flow channels and prevent backflow.

16. The tandem fluid diode system according to claim 14, wherein the inner shell and the middle shell are formed of a plastic material.

17. The tandem fluid diode system according to claim 14, wherein the middle shell is concentrically nested between the inner shell and the outer skin of the cartridge device.

18. The tandem fluid diode system according to claim 17, wherein relative to a top of the cartridge device, the coalescing filter is positioned below the concentrically nested inner shell and middle shell, and above an oil sump into which sequestered oil flows.

19. An air drying, oil sequestering cartridge device, comprising:
 an outer shell;
 a coalescing filter that sequesters oil from a mixture as the mixture passes into the coalescing filter from a middle shell, wherein the middle shell comprises a charging fluid diode structure that prevents backflow of the mixture; and
 an inner shell comprising a purging fluid diode structure that prevents backflow of dried air during purging from the device;
 wherein the middle shell is formed as a cylinder having a smooth inner surface and a plurality of channel walls having outer surfaces that mate with a smooth inner surface of the outer shell to form flow channels through which moist air flows.

\* \* \* \* \*